(12) United States Patent
Mun et al.

(10) Patent No.: US 8,719,734 B2
(45) Date of Patent: May 6, 2014

(54) TWO-STAGE SWIPE GESTURE RECOGNITION

(75) Inventors: Raphael Mun, Bellevue, WA (US); Christian Klein, Duvall, WA (US)

(73) Assignee: Microsoft Corporation, Redmond, WA (US)

(*) Notice: Subject to any disclaimer, the term of this patent is extended or adjusted under 35 U.S.C. 154(b) by 141 days.

(21) Appl. No.: 13/297,274

(22) Filed: Nov. 16, 2011

(65) Prior Publication Data
US 2013/0120254 A1 May 16, 2013

(51) Int. Cl.
G06F 3/033 (2013.01)
G09G 5/00 (2006.01)

(52) U.S. Cl.
USPC .......................................... 715/863; 345/156

(58) Field of Classification Search
None
See application file for complete search history.

(56) References Cited

U.S. PATENT DOCUMENTS

| | | |
|---|---|---|
| 2008/0316183 A1 | 12/2008 | Westerman et al. |
| 2009/0153288 A1 | 6/2009 | Hope et al. |
| 2009/0217211 A1* | 8/2009 | Hildreth et al. ............... 715/863 |
| 2010/0050134 A1 | 2/2010 | Clarkson |
| 2010/0091110 A1 | 4/2010 | Hildreth |
| 2010/0281374 A1 | 11/2010 | Schulz et al. |
| 2010/0295781 A1* | 11/2010 | Alameh et al. ............... 345/158 |
| 2011/0038513 A1 | 2/2011 | Du et al. |
| 2012/0117506 A1* | 5/2012 | Koch et al. .................... 715/773 |

OTHER PUBLICATIONS

R. Sugandhi, et al., "Air Swipe: A Modified Swipe Gesture System", In Proceedings of International Journal of Computer Applications, vol. 26, Issue 7, Jul. 2011, pp. 9-12.

A. Roudaut, et al., "MicroRolls: Expanding Touch-Screen Input Vocabulary by Distinguishing Rolls vs. Slides of the Thumb", In Proceedings of the 27th International Conference on Human Factors in Computing Systems, Apr. 4-9, 2009, 10 pages.

* cited by examiner

*Primary Examiner* — Quan-Zhen Wang
*Assistant Examiner* — Chad Dicke
(74) *Attorney, Agent, or Firm* — Aaron Chatterjee; Andrew Sanders; Micky Minhas

(57) ABSTRACT

Systems, methods and computer program products for facilitating the recognition of user air swipe gestures are disclosed. Such systems, methods and computer program products provide a two-stage gesture recognition approach that combines desirable aspects of object manipulation gestures and symbolic gestures in order to create an interaction that is both reliable and intuitive for users of a computing system. In a first position-based stage, the user moves the cursor into a swipe activation zone. Second, in a motion-based stage, the user swipes their hand from the activation zone past a swipe gate within a certain amount of time to complete the interaction. GUI feedback is provided following the first stage to let the user know that the swipe interaction is available, and after the second stage to let the user know that the swipe is completed.

20 Claims, 6 Drawing Sheets

TWO-STAGE SWIPE GESTURE RECOGNITION

FIELD OF THE INVENTION

The present invention generally relates to computer graphical user interfaces and more particularly to systems, methods and computer program products for facilitating the recognition of user gestures while interacting with a computing system.

BACKGROUND

In today's technological environment, it is common for people to interact with their computing devices—such as mobile telephones, laptops, tablet computers, personal digital assistants (PDAs) and the like—in ways other than using a keyboard and mouse. That is, gesture-based computing as a means for interacting with computer devices has begun to proliferate, ushering in a new era of user interface design. While the full realization of the potential of gesture-based computing remains several years away, its significance cannot be underestimated, especially for a new generation of computing device users accustomed to touching, tapping, swiping, jumping, and moving as a means of engaging with their computing devices.

With respect to swipe (or "fling") gestures, they are widely considered to be a natural interaction for scrolling or paging through lists, pages or other, similar graphical user interface (GUI) elements. Recognizing air swipe—as opposed to touch—gestures and disambiguating intentional gestures from other motions is difficult. In a touch gesture system, these gestures are straight forward because the touch point defines an easily recognizable start and stop to the gesture. On the other hand, in an air gesture system, recognizing an air swipe and disambiguating it from other similar motions is more difficult. In particular, the computing system must disambiguate swipe gestures from the user's natural return/reset motions, while flexibly supporting a range of different (e.g., left, right, up, down, etc.) swipe motions. This is why existing approaches impose unnatural constraints on the user.

Given the foregoing, what are needed are systems, methods and computer program products for facilitating the recognition of user air swipe gestures while interacting with a computing system.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by providing systems, methods and computer program products for facilitating the recognition of user air swipe gestures while interacting with a computing system.

In an embodiment, the present invention provides systems, methods and computer program products that facilitate the recognition of user air swipe gestures while interacting with a computing system using a two-stage approach—a first position-based component followed by a second motion-based component. That is, to begin the gesture, the user moves the cursor into a swipe activation zone near the edge of the user interface screen. Second, to complete the interaction, the user quickly swipes their hand from this zone towards the center of the screen. If the cursor travels from the activation zone to a (potentially invisible) gate within a certain amount of time, the swipe gesture succeeds. GUI feedback is provided following the first stage to let the user know that the swipe interaction is available, and after the second stage to let the user know that the swipe completed.

In an embodiment, unlike existing gesture recognition techniques, the approach of the present invention uses a combination of position-based and motion-based constraints to define a swipe. Users are able to swipe in either direction with either hand, and the two stages of the gesture allow the user interface of the executing application to both teach new users how to swipe, and provide feedback following a successful or unsuccessful swipe gesture.

In yet another embodiment of the present invention, the recognition of non-swipe motions are prevented, particularly the return motion that naturally follows a swipe.

In yet another embodiment, the systems, methods and computer program products of the present invention use skeletal scoring and other specific techniques to reduce the frequency of false positive recognitions.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

The present invention is directed to systems, methods and computer program products for facilitating the recognition of user air swipe gestures.

In various embodiments, such systems, methods and computer program products provide a two-stage gesture recognition approach that combines desirable aspects of object manipulation gestures and symbolic gestures in order to create an interaction that is both reliable and intuitive for users of a computing system. In a first position-based stage, the user moves the cursor into a swipe activation zone—which, in alternate embodiments, may be a physical space in front of the user's body or a region of the onscreen GUI. Second, in a motion-based stage, the user swipes their hand from the activation zone past a "swipe gate" within a certain amount of time to complete the interaction. GUI feedback is provided following the first stage to let the user know that the swipe interaction is available, and after the second stage to let the user know that the swipe is completed.

Figure 1:
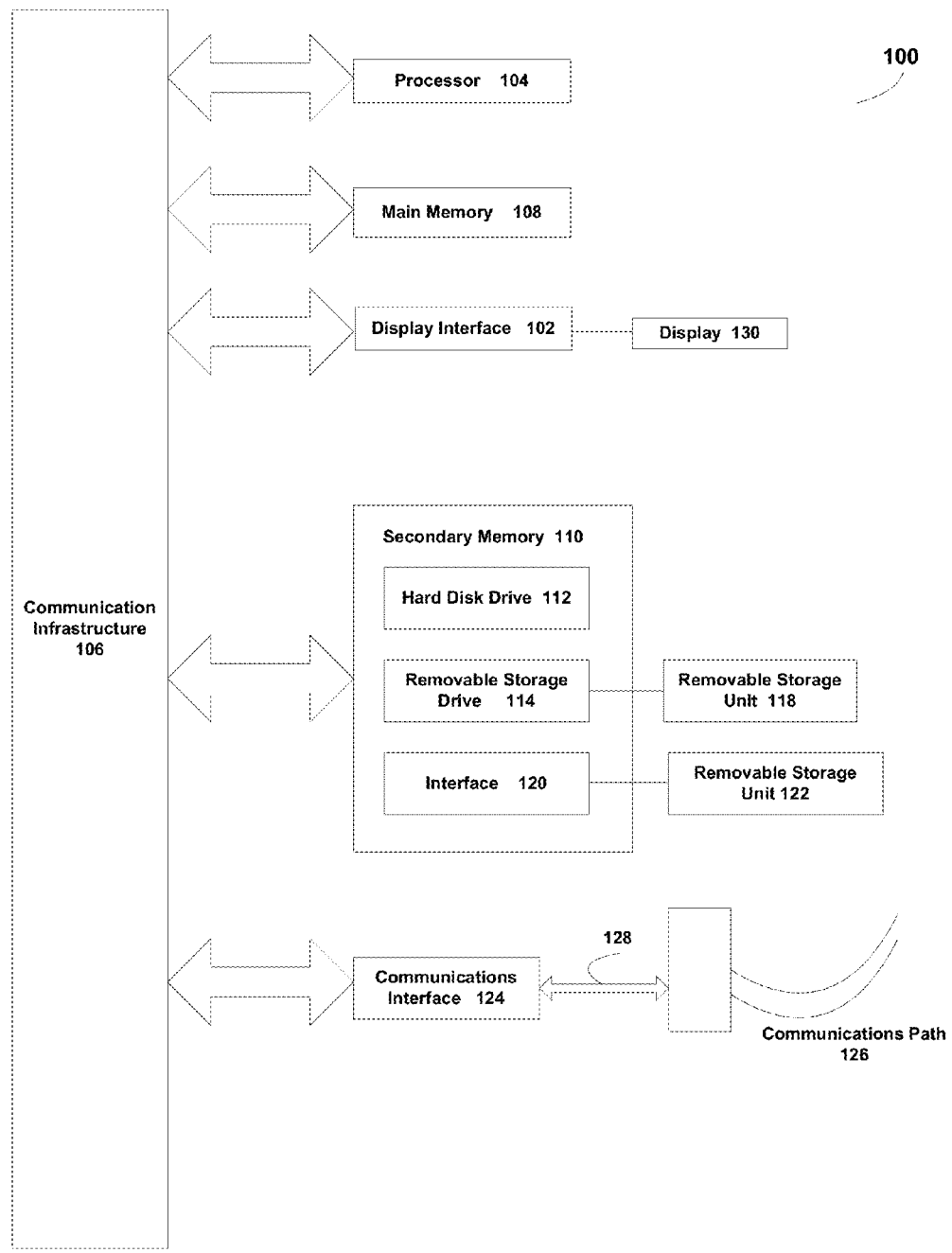
FIG. 1 is a block diagram of an exemplary computer system useful for implementing the present invention.

In one embodiment, the invention is directed toward one or more computer systems capable of carrying out the functionality described herein. An example of a computer system 100 is shown in FIG. 1.

Computer system 100 includes one or more processors, such as processor 104. The processor 104 is connected to a communication infrastructure 106 (e.g., a communications bus or network). Various software aspects are described in terms of this exemplary computer system. After reading this description, it will become apparent to a person skilled in the relevant art(s) how to implement the invention using other computer systems and/or architectures.

Computer system 100 can include a display interface 102 that forwards graphics, text and other data from the communication infrastructure 106 (or from a frame buffer not shown) for display on the display unit 130.

Computer system 100 also includes a main memory 108, preferably random access memory (RAM) and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118 represents a floppy disk, magnetic tape, optical disk, etc. which is read by and written to by removable storage drive 114. As will be appreciated, the removable storage unit 118 includes a computer usable storage medium having stored therein computer software and/or data.

In alternative aspects, secondary memory 110 may include other similar devices for allowing computer programs or other code or instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of non-transitory signals 128 which may be electronic, electromagnetic, optical or other signals capable of being received by communications interface 124. These signals 128 are provided to communications interface 124 via a communications path (e.g., channel) 126. This channel 126 carries signals 128 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 114, a hard disk installed in hard disk drive 112 and signals 128. These computer program products provide software to computer system 100. The invention is directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features of the present invention, as discussed herein. In particular, the computer programs, when executed, enable the processor 104 to perform the features of the present invention. Accordingly, such computer programs represent controllers of the computer system 100.

In an embodiment where the invention is implemented using software, the software may be stored in a computer program product and loaded into computer system 100 using removable storage drive 114, hard drive 112 or communications interface 124. The control logic (software), when executed by the processor 104, causes the processor 104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 1 may be configured as any number of computing devices such as a game console, a portable media player, a desktop, a laptop, a server, a tablet computer, a PDA, a mobile computer, a smart telephone, a mobile telephone, an intelligent communications device or the like.

In yet another embodiment, the invention is implemented using a combination of both hardware and software.

Figure 2:
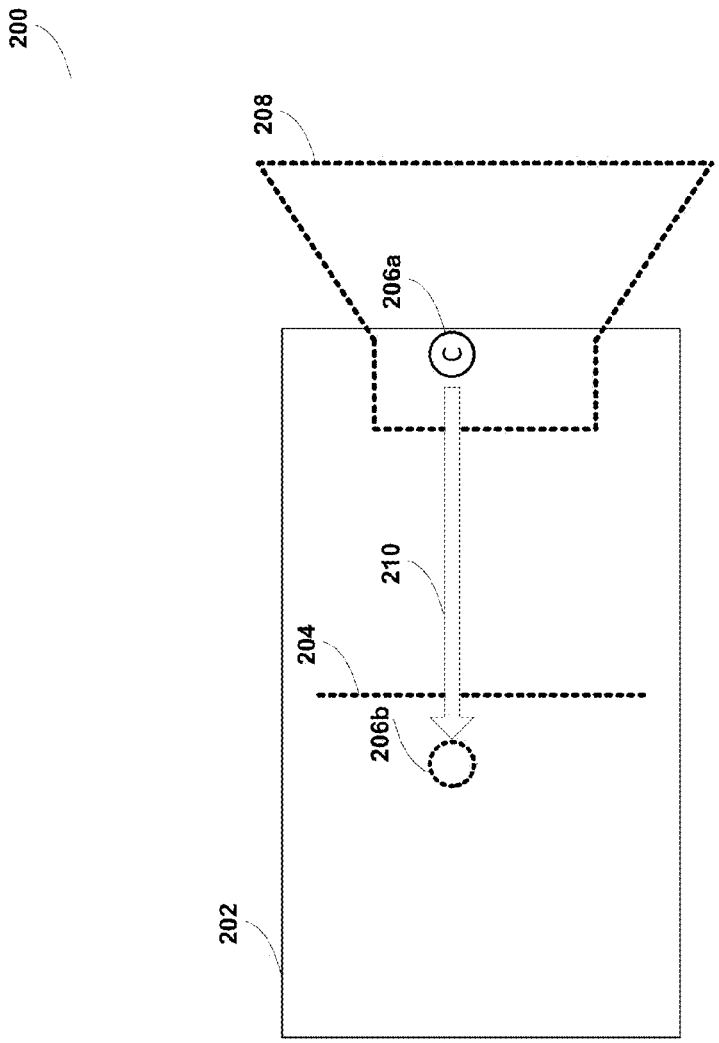
FIG. 2 is a block diagram illustrating an exemplary computing device user interface screen utilizing a two-stage, air swipe gesture recognition process according to an embodiment of the present invention.

Referring to FIG. 2, a block diagram illustrating an exemplary graphical user interface environment 200 that is utilizing a two-stage, air swipe gesture recognition process, according to an embodiment of the present invention, is shown. As will be appreciated by those skilled in the relevant art(s) after reading the description herein, environment 200 would occur on computer system 100 as part of an executing computer program (software) application where swipe gesture interaction is supported (e.g., a video game, an e-learning application, a media player application, a word processing or other productivity application, an operating system, etc.)

Environment 200 includes a GUI screen 202 produced by a computer program (software) application, executing on device 100, where swipe gesture interaction is supported. First, to begin a gesture, the user moves a cursor 206a into a swipe activation zone 208 near the edge of screen 202. The presence of swipe activation zone 208 allows computing system 100 to disambiguate intentional swipe gestures from the user's natural (and often unintentional) return/reset motions. To move cursor 206a, the user would need to activate (i.e., make visible) the cursor within screen 202 by, for example, standing and gesturing within zone 208. As will be appreciated by those skilled in the relevant art(s) after reading the description herein, activation zone 208 is partially on screen 202 ("on-screen") and partially off screen 202 ("off-screen"). The off-screen portion of zone 208 may within the field of view of a 3D depth camera located on, or peripheral to, device 100 (e.g., in an embodiment where device 100 is an Xbox® 360 video game console, equipped with a Kinect™ motion sensing input device available from Microsoft Corporation of Redmond Wash., or a laptop or tablet computer equipped with a camera). This allows the use of on-screen regions 208 and off-screen regions 208 to allow a range of user motions while being compatible with a cursor-targeting user interface.

Next, in stage two, the user quickly swipes their hand from zone 208 towards the center of screen 202 following the path indicated by arrow 210 to complete the interaction with device 100. If the cursor travels from activation zone 208 to a pre-determined demarcation line (i.e., a "swipe gate") 204 that may be visible (or invisible) to the user within a certain amount of time, the swipe gesture succeeds and position of cursor 206*b* is now in the middle of screen 202. As will be appreciated by those skilled in the relevant art(s) after reading the description herein, FIG. 2 illustrates a "left swipe" gesture. Thus, in an embodiment, user interface screen 200 would provide feedback following the first stage to let the user know that the swipe interaction is available, and after the second stage to let the user know that the swipe was successful (i.e., completed).

Figure 3:
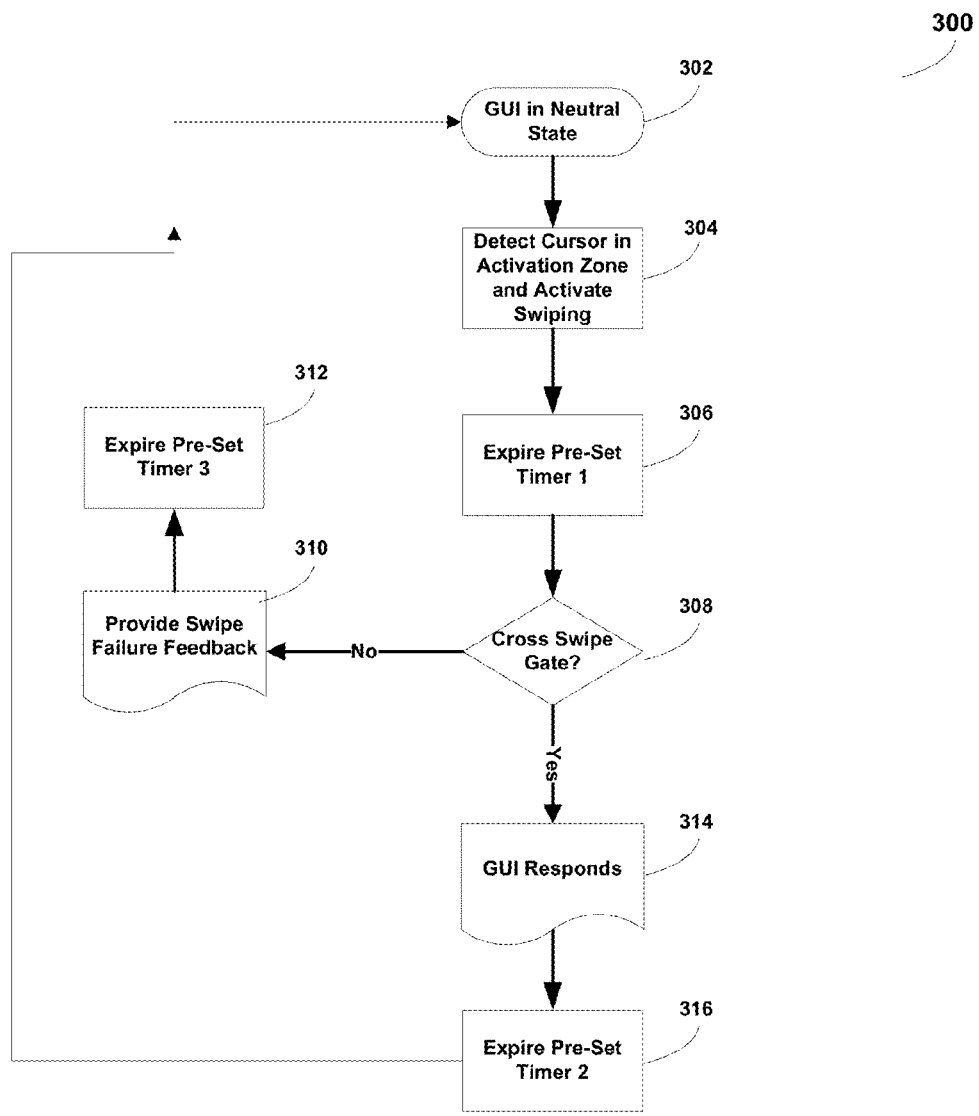
FIG. 3 is a flowchart illustrating an exemplary two-stage, air swipe gesture recognition process according to an embodiment of the present invention.

Referring now to FIG. 3, a flowchart illustrating an exemplary two-stage, air swipe gesture recognition process 300, according to an embodiment of the present invention, is shown.

Figure 4A:
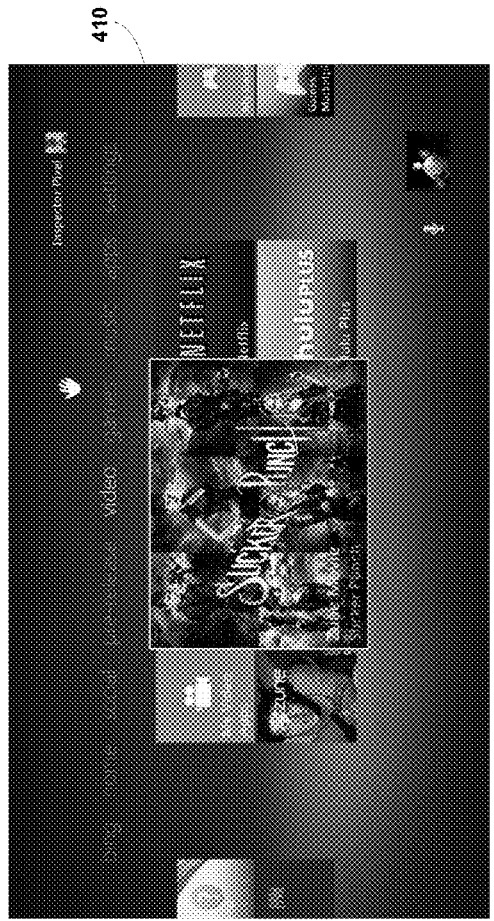
FIGS. 4A-F are screenshots illustrating exemplary graphical user interface (GUI) windows employing the two-stage, air swipe gesture recognition process according to various embodiments of the present invention.
Figure 4B:
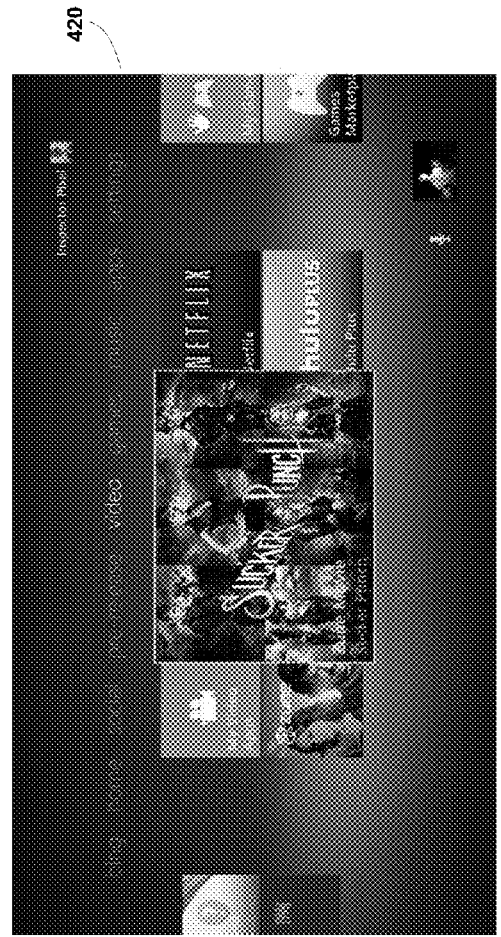
Figure 4C:
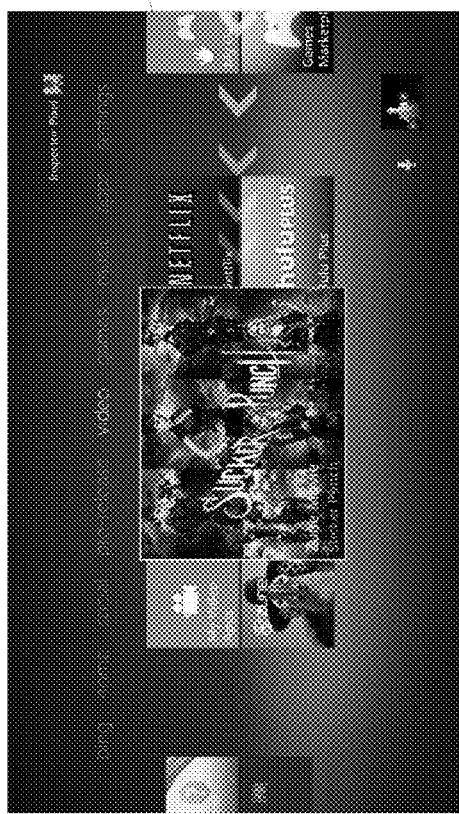
Figure 4D:
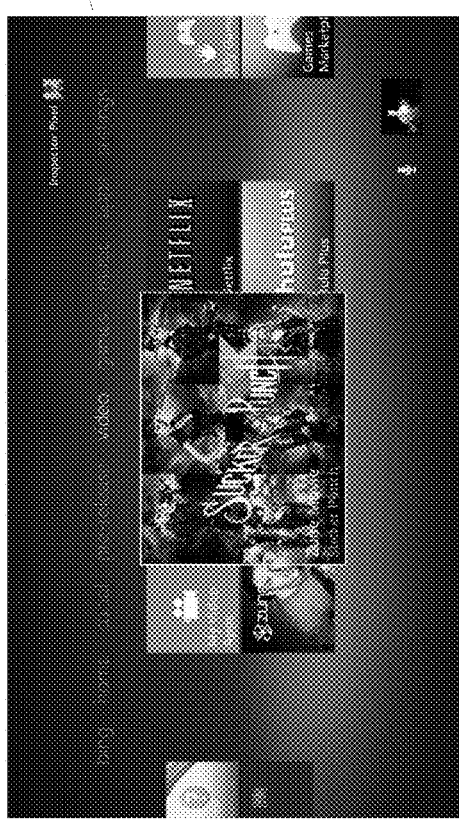
Figure 4E:
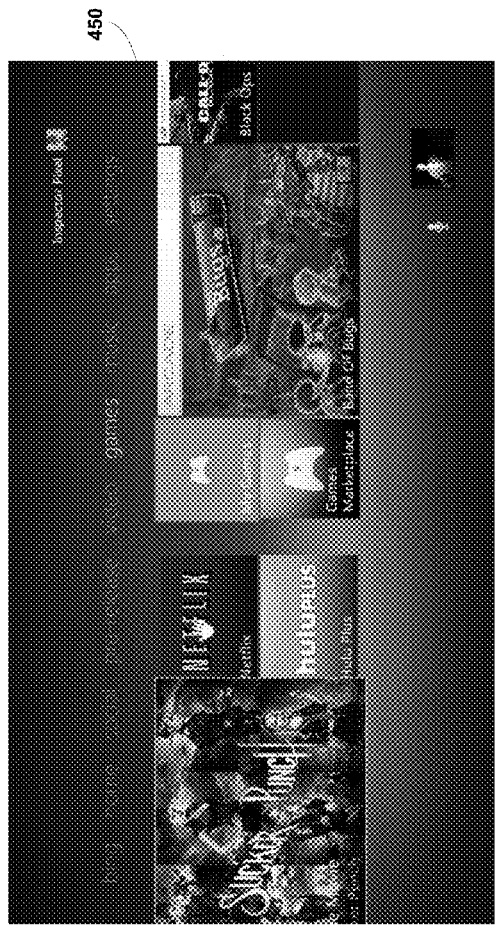
Figure 4F:
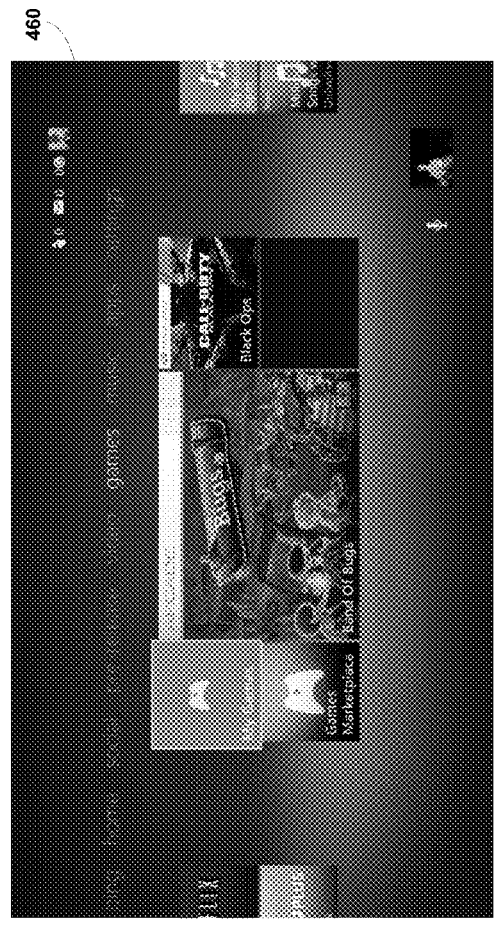

Process 300, which would execute on computer system 100 within environment 200, begins at step 302 while GUI 202 is in a neutral state. A visual cue indicates that a scrolling or paging interaction is possible. For example, content from the next and previous pages may visually "peek" in from the sides of the screen. (See FIG. 4B.) Alternatively, an arrow or similar indicator may be used. Control would then pass to step 304.

In step 304, when the user moves cursor 206 into one or more swipe activation zones 208, the gesture is temporarily enabled in the associated direction and for the gesturing hand. Swipe activation zones 208 are most naturally placed on the left and right sides of screen 202 but may in principle be used for vertical swiping as well. In addition, GUI 202 feedback is provided to confirm that the swipe gesture is ready and to provide instructions for how to swipe (e.g., using an animation). GUI 202 feedback (but not the gesture) may be delayed slightly to avoid displaying while the user moves cursor 206 near the edge screen 202 without intending to swipe. In this way, additional help is provided for new users who hover over a zone 208, but are unsure about what to do, while expert users can swipe before triggering the feedback. By extending off-screen, activation zones 208 require minimal overlap with visible GUI 202 elements while at the same time allowing users to perform a larger, more natural swipe motion that starts off-screen. The on-screen portion of zone 208 may be limited in height to avoid interfering with other interactive or status display elements and to filter out unintentional motions, but can broaden off-screen to be more flexible in the range of supported motions.

In step 306, as soon as the cursor 206 exits activation zone 208, a pre-set swipe countdown timer begins. This timer defines the amount of time that the cursor 206 may travel towards swipe gate 204, effectively enforcing a minimum average speed for the swipe motion.

In step 308, it is determined if cursor 206 crosses swipe gate 204 before the countdown timer expires. If the determination of step 306 is negative (i.e., cursor 206 has not crossed swipe gate 204 before the countdown timer expires), the swipe fails. Thus, in step 310, GUI feedback informs the user that the swipe did not complete. For example, the content being navigated may slide partially across the screen and then "bounce" back to its original location. By scaling this feedback based on how far the cursor 206 traveled, the user knows not only that the swipe failed but also how close the motion came to succeeding, thus allowing the user to learn over time how to operate the application executing on device 100 effectively. GUI 202 would then return to the neutral state (step 302).

If the determination of step 308 is positive, the swipe succeeds and GUI 202 responds accordingly (e.g., by paging) in step 314.

Then, in step 316, because of the successful air swipe, the opposite activation zone 208 for that hand is temporarily disabled for a pre-set time period to prevent an accidental activation when the user moves their hand back towards its original location. If the user moves into the disabled zone 208 within this time interval, that zone 208 remains disabled until the user moves out of the zone again. This behavior ensures that a user who swipes all the way from one activation zone to the opposite zone without stopping in the middle will not trigger accidental interactions. Once this timer expires, the opposite zone is enabled again.

If the swipe is unsuccessful, a similar timer temporarily disables the activation zone, in step 312, to prevent an accidental activation immediately following a failed swipe (in this scenario, a user is attempting to quickly reattempt the failed swipe interaction).

As will be appreciated by those skilled in the relevant art(s) after reading the description herein, swipe countdown timers of steps 306, 312, and 316, in alternate embodiments, may be set to the same value (e.g., 0.5 second, 1 second, 2 seconds, etc.) or to different values. Further, in alternate embodiments, these timers may be globally set by the application executing on device 100, contextually set by the application executing on device 100 (i.e., the value changes depending on which of many screens 202 the application is currently displaying) or set by the user themselves as a customization option of the application or device 100.

In an embodiment, each of the recovery timers may only affect the activation zone 208 on the opposite side, and only when gesturing with the same hand. In such an embodiment, environment 202 supports the ability of the user to swipe repeatedly in the same direction using the same hand, or swipe in one direction with one hand immediately after swiping in the other direction with the other hand.

In an alternate embodiment, to further improve the performance of two-stage, air swipe gesture recognition process 300, the swipe countdown timers and the positions of swipe gates 204 may differentiate between "forehand" and "backhand" swipe gestures. For example, a user moving from an activation zone 208 on the left side of screen 202 and swiping towards the right using their right hand is performing a "backhand" swipe gesture with that hand. In general, users tend to make slower and shorter gestures in the backhand direction based on their physiology.

In an alternate embodiment, to further improve the performance of two-stage, air swipe gesture recognition process 300, an additional check performed at the half-way position of the swipe (e.g., midway between the cursor 206*a* position and the cursor 206*b* position along path 210) may place additional constraints on the gesture recognition. More specifically, a valid swipe must exceed a defined speed and its direction of motion must be along a particular dominant axis at this midpoint.

In yet another alternate embodiment, to further improve the performance of two-stage, air swipe gesture recognition process 300, a swipe gesture may be rejected when any of the following conditions are met to prevent accidental activations caused by low-quality skeletal data underlying the gesture recognition: if the skeletal tracking is lost during a swipe, that gesture is canceled and all activation zones 208 are reset to their ready state; if confidence values for critical joint positions (e.g., hands) falls to an unacceptable level, the gesture is canceled; and if the user's skeleton is in an invalid state (e.g., facing away from the sensor creating zone 208), the interaction is disabled. As will be appreciated by those skilled in the relevant art(s) after reading the description herein, such an embodiment would be utilized within a system 100 that employs a gesture recognition system based on human skeletal tracking technology using a depth sensor.

Referring to FIGS. 4A-F, screenshots 410-460 illustrating exemplary graphical user interface (GGUI) windows employing the two-stage, air swipe gesture recognition process, according to various embodiments of the present invention, are shown. (As will be appreciated by those skilled in the relevant art(s) after reading the description herein, screenshots 410-460 represent different states of user interface screen 202 while process 300 executes on computer system 100.)

In an embodiment, screen 202 would resemble screenshot 410 when the GUI is at rest (step 302). The hand shown near the top of the screen is cursor 206, which the user is manipulating by moving their hand in front of their body. The labels along the top represent channels of content. The video channel is currently onscreen, and the games channel is next to the right.

In an embodiment, screenshot 420 shows the GUI after the user has moved cursor 206 into one of the activation zones 208. In this example, the content "peeking" in from the games channel on the right becomes more visually prominent to show that the swipe gesture is now ready. Since activation zone 208 extends off the right side of the screen, cursor 206 may not be visible in this state.

In an embodiment, screenshots 430 and 440 show two frames of an animation that plays if the user does not know what to do and waits while in this activation zone. The arrows provide more explicit instruction to guide the user in learning the swipe.

In an embodiment, screenshot 450 shows one frame of the transition animation following a successful swipe (step 314). The content is moving towards the left in order to transition to the games channel. If the user had not successfully completed the gesture (e.g., the swipe motion was too slow or too short) then the content would instead "bounce" back (step 310) to its original position, and the GUI would remain on the video channel.

In an embodiment, screenshot 460 shows the GUI at rest again (step 302), but now on the games channel after a successful swipe.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A method executable on at least one processor of a computing device, the method comprising:
    activating a cursor in a first activation zone, said first activation zone defined by a first area along a first edge of a graphical user interface screen that is provided on a display and that includes less than the entire area of the graphical user interface, by an application executing on the computing device;
    starting a first countdown timer upon detecting said cursor exiting said first activation zone and moving towards a central location on said graphical user interface screen;
    determining whether said cursor has crossed a swipe gate before the expiration of said first countdown timer; when said cursor has crossed said swipe gate before the expiration of said first countdown timer:
    providing a first response via said graphical user interface screen, said first response indicative that said application executing on the computing device has recognized an air swipe; starting a second countdown timer; and
    disabling a second activation zone, said second activation zone defined by a second area along a second edge opposing the first edge of said graphical user interface screen and that includes less than the entire area of the graphical user interface, until said second countdown timer has expired; and when said cursor has not crossed said swipe gate before the expiration of said first countdown timer: providing a second response via said graphical user interface screen, said second response indicative that said application executing on the computing device has not recognized an air swipe;
    starting a third countdown timer upon providing said second response; and
    disabling said second activation zone within said graphical user interface screen until said third countdown timer has expired.

2. The method of claim 1, wherein the computing device is one of: a game console, a laptop, a portable media player, a tablet computer, a PDA, a mobile computer, or a mobile telephone.

3. The method of claim 1, further comprising:
    providing, in response to activating said cursor in said first activation zone, feedback that the computing device is ready to recognize an air swipe gesture.

4. The method of claim 1, wherein said first area of said first activation zone is an on-screen area, and wherein said first activation zone is further defined by an off-screen area located outside said display.

5. The method of claim 4, wherein:
    said first edge is one of a left side edge or a right side edge of said graphical user interface screen, said second edge is one of the right side edge or the left side edge respectively, and said off-screen area is located in a field of view of a camera.

6. The method of claim 4, wherein said on-screen area is defined by a substantially constant height, and said off-screen area is defined by a continuous broadening in height extending away from said display.

7. The method of claim 6, wherein said air swipe originates from said off-screen area.

8. A computer program product that is not a signal, the computer program product containing instructions that when executed by a computer facilitate the recognition of air swipe gestures, said instructions comprising program code configured to:
  detect activation of a cursor in a first activation zone, said first activation zone defined by a first area along a first edge of a graphical user interface screen displayed on the computer and that includes less than the entire area of the graphical user interface; start a first countdown timer, upon detecting said cursor exiting said first activation zone and moving towards a central location on said graphical user interface screen; determine whether said cursor has crossed a swipe gate before the expiration of said first countdown timer; provide a first response via said graphical user interface screen, said first response indicative that the computer has recognized an air swipe; start a second countdown timer;
  disable a second activation zone, said second activation zone defined by a second area along a second edge opposing the first edge of said graphical user interface screen and that includes less than the entire area of the graphical user interface, until said second countdown timer has expired; provide a second response via said graphical user interface screen, said second response indicative that the computer has not recognized an air swipe; start a third countdown timer upon providing said second response; and
  disable said second activation zone within said graphical user interface screen until said third countdown timer has expired.

9. The computer program product of claim 8, wherein the computer is one of: a game console, a laptop, a portable media player, a tablet computer, a PDA, a mobile computer, or a mobile telephone.

10. The computer program product of claim 8, further comprising program code configured to:
  provide an indication that the computer is ready to recognize the air swipe gesture.

11. The computer program product of claim 8, wherein said first area of said first activation zone is an on-screen area, and wherein said first activation zone is further defined by an off-screen area located outside said display.

12. The computer program product of claim 11, wherein: said first edge is one of a left side edge or a right side edge of said graphical user interface screen, said second edge is one of the right side edge or the left side edge respectively, and said off-screen area is located in a field of view of a camera.

13. The computer program product of claim 11, wherein said on-screen area is defined by a substantially constant height, and said off-screen area is defined by a continuous broadening in height extending away from said display.

14. A computer system for facilitating the recognition of air swipe gestures, comprising:
  a processor;
  a display; and
  a memory having stored therein, instructions that when executed by the processor:
    detect activation of a cursor in a first activation zone, said first activation zone defined by a first area along a first edge of a graphical user interface screen displayed on the display and that includes less than the entire area of the graphical user interface;
    start a first countdown timer, upon detecting the movement of said cursor exiting said first activation zone and moving towards a central location on said graphical user interface screen;
    determine whether said cursor has crossed a swipe gate before the expiration of said first countdown timer;
    provide a first response via said graphical user interface screen, said first response indicative that an air swipe has been recognized;
    start a second countdown timer;
    disable a second activation zone, said second activation zone defined by a second area along a second edge opposing the first edge of said graphical user interface screen and that includes less than the entire area of the graphical user interface, until said second countdown timer has expired;
    provide a second response via said graphical user interface screen, said second response indicative that an air swipe has not recognized;
    start a third countdown timer upon providing said second response; and
    disable said second activation zone within said graphical user interface screen until said third countdown timer has expired.

15. The system of claim 14, wherein the computer system is one of: a game console, a laptop; a portable media player, a tablet computer, a PDA, a mobile computer, or a mobile telephone.

16. The system of claim 14, further comprising instructions that when executed by the processor:
  provide an indication that the computer system is ready to recognize an air swipe gesture.

17. The computer system of claim 14, wherein said first area of said first activation zone is an on-screen area, and wherein said first activation zone is further defined by an off-screen area located outside said display.

18. The computer system of claim 17, wherein:
  said first edge is one of a left side edge or a right side edge of said graphical user interface screen, said second edge is one of the right side edge or the left side edge respectively, and said off-screen area is located in a field of view of a camera.

19. The computer system of claim 18, wherein said on-screen area is defined by a substantially constant height, and said off-screen area is defined by a continuous broadening in height extending away from said display.

20. The computer system of claim 19, wherein said air swipe originates from said off-screen area.

* * * * *